Dec. 12, 1933.  P. BROSSE  1,939,039

COLORED FILTER

Filed Feb. 24, 1928

INVENTOR:
Paul Brosse
BY
ATTORNEY

Patented Dec. 12, 1933

1,939,039

UNITED STATES PATENT OFFICE 1,939,039

COLORED FILTER

Paul Brosse, Neuilly, France, assignor, by mesne assignments, to Kislyn Corporation, New York, N. Y., a corporation of Delaware Application February 24, 1928, Serial No. 256,643, and in France February 28, 1927

4 Claims. (Cl. 95—81.5)

Tinted gelatine color films, as used for the projection of goffered films, offer two characteristic definitions:

1. They fail to distribute color uniformly over the whole film surface and have to be combined with a system of prisms or of cylindrical lenses in order to give their full effect;

2. Their coloring fades very quickly.

The object of my invention is to overcome this towfold deficiency whenever a system of filters is to be intercalated between the source of light and the goffered film in a line; such film being of the type in which a linear goffering is utilized.

My invention is characterized by the use of colored salt solutions arranged in or circulated through juxtapositioned cylindrical tubes interposed in the path of the light beam passing from the condenser to the film. Due to the breaking or splitting-up action that is exerted on light by a tube filled with a liquid having an index of refraction different from that of the medium wherein the tube stands (air, for instance), each "screen-tube" will operate first after the manner of a short-focussed cylindrical lens.

Figure 1:
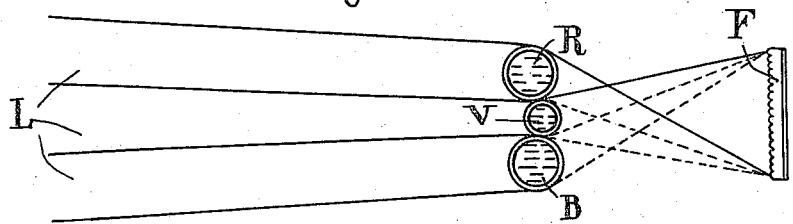
Figure 2:
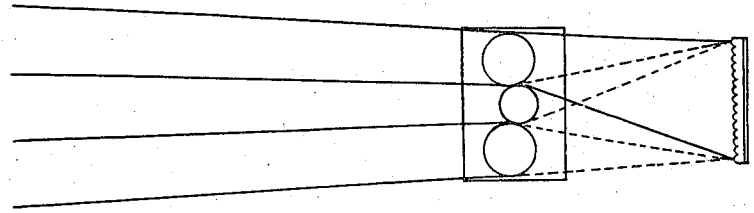
Figure 3:
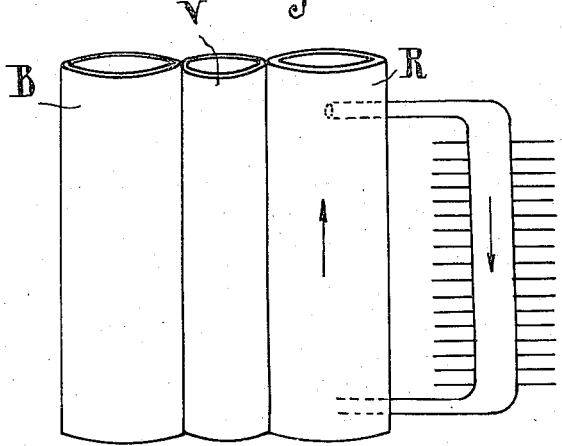

In the accompanying drawing, Figure 1 is a sectional view of the invention taken in a direction perpendicular to the filter tubes; Fig. 2 is a view of a modification in which the tubes are immersed in a tank filled with liquid; and Fig. 3 is a fragmental diagrammatic perspective view, on an enlarged scale, showing the projection from the tubes in a direction parallel with the optical axis.

It will be apparent from Fig. 1 that the beam L passing through each tube becomes spread over the whole surface of the goffered film F to be illuminated. On the other hand, owing to the fact that the colors are those of the salt solutions themselves, the coloring of the filters will not be liable to fade.

The red, green and blue tubes, in Fig. 1, containing solutions of the corresponding colors, are designated R, V and B, respectively; and in the modification illustrated in Fig. 2, the same reference characters are employed to indicate the tubes of the same colors as before, while L likewise indicates the light beams and F the film. In the latter case, however, the tubes are immersed in a parallel-faced tank T which is filled with a liquid having an index of refraction different (and, preferably, higher) than that of the liquids with which the tubes are filled: for instance, certain chlorides of carbon, the tetrachloride, for example. In this case the tubes will act as diverging cylindrical lenses, and will again distribute over the whole surface of the film to be projected the beams that pass through them.

In Fig. 3, R is again the red tube, V the green tube and B the blue tube. Tube R is shown connected with a thermo-siphon device S, which, indeed, should be separately applied to each one of the three tubes in order to permit the liquids to cool. In the case where the tubes are plunged into a liquid, the latter is what there would be occasion to cool by means of the thermo-siphon device.

The mineral salts to be used (in aqueous solution) for each one of the liquid screens may vary. I will indicate, as examples, the following ones:

For red:

1. 10% chromic acid solution with chloride of cobalt added, or 2. 1/1000 chameleon mineral with red chromate of potash added.

For green:

3. 50% nitrate of copper with red chromate of potash added.

For blue: 4. 1% "Celestial" liquor (nitrate of copper and diluted ammonia); or

5. Nitrate of copper up to saturation with sulphate of chromium added.

Solutions 1, 3 and 4 are especially suitable.

Where projection is to be effectuated with filters arranged between the film and the camera, solutions enclosed in cylindrical tubes cannot be used; but the solutions can be introduced into juxtaposed parallel-faced tanks without the sharpness of the projection being impaired.

I claim as my invention:

1. A polychrome filter for projecting goffered films in colors, comprising a plurality of lenses formed of transparent hollow elements disposed in fixed position immediately adjacent one another in the path of the light rays and containing different colored liquids corresponding to the colors to be projected.

2. A polychrome filter for projecting goffered films in colors, comprising a plurality of lenses formed of transparent hollow elements disposed in fixed position immediately adjacent one another in the path of the light rays and containing solutions of different colored salts corresponding to the colors to be projected.

3. A polychrome filter for projecting goffered films in colors, comprising a transparent, parallel-faced tank containing liquid, and a plurality of transparent tubular elements immersed in the tank liquid and situated immediately adjacent one another in the path of the light rays; said tubular elements containing different colored liquids having a refraction index lower than that of the tank liquid and corresponding to the colors to be projected.

4. In combination, a goffered film subjected to a beam of light, a polychome filter in fixed position relative to said film and comprising a plurality of cylindrical lenses parallel to each other and to the gofferations of the film and arranged side by side transversely of said beam of light and in the path thereof, said lenses being of different color values which when combined gives substantially the sensation of white light.

PAUL BROSSE.